United States Patent [19]

Rademacher

[11] 4,218,852
[45] Aug. 26, 1980

[54] DIAMOND LAPPING COMPOUND STICK AND HOLDER

[76] Inventor: Frank Rademacher, 4112 Shoreland Dr., Vero Beach, Fla. 32960

[21] Appl. No.: 947,593

[22] Filed: Oct. 2, 1978

[51] Int. Cl.³ .............................................. B24D 17/00
[52] U.S. Cl. .................................... 51/211 R; 51/306; 401/68
[58] Field of Search .......................... 132/88.7; 424/64; 51/211 R, 305, 306, 165.8, 165.81, 370; 401/59, 68

[56] References Cited

U.S. PATENT DOCUMENTS

| | | | |
|---|---|---|---|
| 2,129,377 | 9/1938 | Libovitz | 51/306 |
| 2,347,597 | 4/1944 | Ehrlich | 51/305 |
| 2,417,800 | 3/1947 | Weisser | 51/306 |
| 3,479,429 | 11/1969 | Morshauser et al. | 424/64 |
| 3,934,598 | 1/1976 | Hayes et al. | 132/88.7 |

Primary Examiner—Donald J. Arnold
Attorney, Agent, or Firm—Mitchell J. Hill

[57] ABSTRACT

This invention relates to a stick of diamond lapping compound in combination with a cosmetic type holder.

2 Claims, 1 Drawing Figure

DIAMOND LAPPING COMPOUND STICK AND HOLDER

BACKGROUND ART

Diamond lapping compounds are applied the surface of a workpiece in various ways and by means of various holding devices. That is, one way is by means of a syringe containing a cylindrical cartridge of diamond lapping compound forced out of a small opening by pressing the plunger at the opposite end of the syringe.

A second way is to use a collapsible tube such as used in toothpaste to force out the diamond lapping compound.

In another way, diamond lapping compound is scooped out from a jar with a dabber and applied to the surface of a workpiece by the user. All of the above noted uses tend to waste or use the expensive diamond lapping compound.

The prior art shows a polishing kit such as disclosed in U.S. Pat. No. 2,825,085, and an abradant holder in U.S. Pat. No. 2,044,896, and a cosmetic holder and applicator as disclosed in U.S. Pat. No. 3,934,598. However, none of the patents cited shows a cosmetic type holder using an abrading compound for the applicator.

DISCLOSURE OF THE INVENTION

The diamond lapping compound is applied to the surface of a workpiece by the user or operator with a cosmetic type holder. The diamond lapping compound is a combination of diamond micron powder mixed with a carrier comprising paraffin, mineral oil, carnauba wax and petroleum jelly.

BEST MODE FOR CARRYING OUT THE INVENTION

Figure 1:
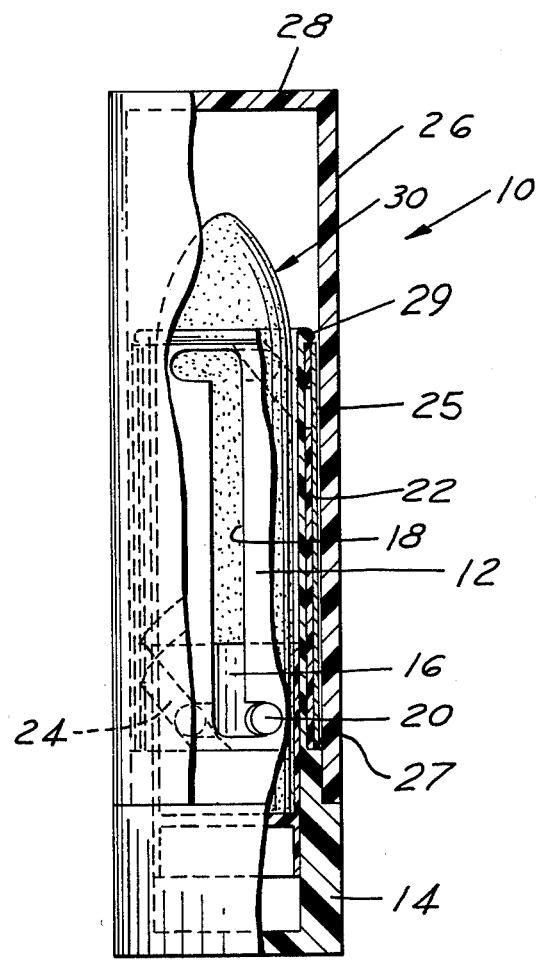
FIG. 1 shows a cosmetic-type holder with the applicator stick being the diamond lapping compound.

In accordance with the present invention there is provided a holder 10 having an elongated inner sleeve guide member 12 connected to a rotatable knob 14. A receptacle 16 for holding the stick of diamond lapping compound 30 is adapted to be slidable in the inner sleeve guide member 12 in a manner as herein described. The inner sleeve guide member 12 consists of a pair of diametrically opposed elongated slots 18 which allows the receptacle 16 to move longitudinally in the inner sleeve guide member and held therein by means of a pair of projections 20 diametrically opposed to each other on the outer surface of the receptacle 16. The inner sleeve guide member is encased in an outer sleeve member 22. The outer sleeve member comprises a slot 24 located longitudinally and diagonally and is entirely encased in a cylinder member 25. The cylinder member 25 is adjacent the outer sleeve 22 and both members abut the shoulder 27 of the inner sleeve member 12 at one end thereof, and is held from slipping out at the other end by a lip 29 on the opening end of the inner sleeve member 12.

Thus it is readily apparent that turning the knob 14 and grasping or holding the cylinder member 25, the receptacle 16 is moved axially or longitudinally within the inner surface of the inner sleeve guide member 12. This is accomplished by means of the diametrically opposed projections 20 moving longitudinally in the diagonal slot 24. A cover or outer casing 26 comprising an opening at one end and a closed end 28 provides a seal and cover for the unit.

The diamond lapping compound stick comprises diamond micron powder which is a very fine grade of diamond. Normally, fine grade is defined as diamond micron powder screened through 0.060 (60 thousands) per square inch mesh. The uniformity of the diamond lapping compound is important to the user. The grades of diamond powder are available from the finest powder to grades where application demands rapid stock removal. The purity of the diamond powder content is therefore important.

Applicant's contribution is to provide a stick of diamond lapping compound in an applicator which is compact and easy to use by an operator. That is, an individual may use several different grades of diamond lapping compound before the workpiece is polished to the specification required. In order to do so, an operator will start with coarser grade of diamond lapping compound and end with using an extremely fine or superfinish diamond lapping compound.

There are several or various grades of diamond lapping compound. Each grade conforms to the grade of diamond, or so many micron diamonds per gram. Primarily, the basic carrier compound consists of 7.6% by weight of petroleum jelly, 43.9% by weight of paraffin, 45.8% by weight of mineral oil and 2.7% by weight of carnauba wax to form the basic carrier compound. Specifically, the ingredients by weight are 1 pound or 453.6 grams of petroleum jelly, 5.75 pounds or 2.608 kilograms of paraffin, 6 pounds or 2.72 kilograms of mineral oil and 160 grams of carnauba wax; totaling approximately 5.94 kilograms of basic carrier compound. From this basic carrier compound 500 grams is removed to be mixed 25 carats or grams of diamond micron powder. That is, the 25 carats or grams of micron diamond powder is a grade of diamond. The 500 grams of basic carrier compound along with the 25 carats or grams of diamond micron powder is remelted to form a homogeneous mixture. This mixture is allowed to cool in a mold to form a 2½ gram or 5 gram stick of diamond lapping compound. That is, the stick of lapping compound comprises by weight either 2½ grams or 5 grams of carrier compound which includes in correct proportion as indicated hereinbefore, petroleum jelly, paraffin, mineral oil and carnauba wax, to be included with a proper proportion of diamond micron powder. For example, the 2½ gram stick would consist of carrier compound and 0.025 grams or 0.125 carats of diamond micron powder and the 5 gram stick would consist of the carrier compound and 0.05 grams or 0.25 carats of diamond micron powder.

Diamond micron powder used for lapping purposes normally consists of approximately fifteen different sizes. Therefore, by varying the number of grams of micron diamond powder with the basic carrier compound, a diamond lapping compound is obtained that ranges from the low coarse or rough grade to a very high superfinish grade.

Variations and modifications are possible without departing from the spirit of the invention.

What is claimed is:

1. A cosmetic-type stick diamond lapping compound and holder, comprising:
   a. a hollow, essentially cylindrical, inner sleeve member having an opening at one end and a knob at the other end, said inner sleeve member includes a pair of diametrically opposed longitudinally extending slots;

b. a receptacle disposed within said cylindrical inner sleeve member, said receptacle consists of a pair of projections diametrically opposed on the outer surface thereof and interconnecting said diametically opposed slots of said inner sleeve member;

c. an outer sleeve member encompassing said inner sleeve member, said outer sleeve member includes a longitudinally extending diagonal slot;

d. a cylinder member encompassing said inner sleeve member and said outer sleeve member whereby said receptacle is adapted for longitudinal movement therein; and e. 5 gram stick of diamond lapping compound encased in said receptacle, said stick of diamond lapping compound comprises:
  1. 7.6% by weight of petroleum jelly, 43.9% by weight of paraffin, 45.8% by weight of mineral oil, and 2.7% by weight of carnauba wax; and
  2. 0.25 carats of diamond micron powder.

2. A cosmetic-type stick diamond lapping compound and holder, comprising:

a. a hollow, essentially cylindrical, inner sleeve member having an opening at one end and a knob at the other end, said inner sleeve member includes a pair of diametrically opposed longitudinally extending slots;

b. a receptacle disposed within said cylindrical inner sleeve member, said receptacle consists of a pair of projections diametrically opposed on the outer surface thereof and interconnecting said diametically opposed slots of said inner sleeve member;

c. an outer sleeve member encompassing said inner sleeve member, said outer sleeve member includes a longitudinally extending diagonal slot;

d. a cylinder member encompassing said inner sleeve member and said outer sleeve member whereby said receptacle is adapted for longitudinal movement therein; and e. a $2\frac{1}{2}$ gram stick of diamond lapping compound encased in said receptacle, said stick of diamond lapping compound comprises:
  1. 7.6% by weight of petroleum jelly, 43.9% by weight of paraffin, 45.8% by weight of mineral oil, and 2.7% by weight of carnauba wax; and
  2. 0.125 carats of diamond micron powder.

* * * * *